US008381105B2

(12) United States Patent
Chand et al.

(10) Patent No.: US 8,381,105 B2
(45) Date of Patent: Feb. 19, 2013

(54) PRESENTING VIDEO AS A BACKGROUND ON A SEARCH ENGINE HOME PAGE

(75) Inventors: Rajeev Kumar Chand, Redmond, WA (US); Stephanie S. Horstmanshof, Shoreline, WA (US); Marcela Sobrinho Pereira, Bellevue, WA (US); Robert James Barber, Bellevue, WA (US); Sarah K. Berrier, Shoreline, WA (US); Craig J. Miller, Mill Creek, WA (US); Keith Alan Regier, Kirkland, WA (US); Javier Garcia Flynn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/183,135

(22) Filed: Jul. 14, 2011

(65) Prior Publication Data
US 2013/0019146 A1 Jan. 17, 2013

(51) Int. Cl.
*G06F 17/00* (2006.01)
(52) U.S. Cl. ......... 715/719; 715/201; 715/716; 715/723
(58) Field of Classification Search .................. 715/201, 715/716, 719, 723
See application file for complete search history.

(56) References Cited

U.S. PATENT DOCUMENTS

| | | | | |
|---|---|---|---|---|
| 6,006,265 | A * | 12/1999 | Rangan et al. | 709/226 |
| 6,089,975 | A * | 7/2000 | Dunn | 463/16 |
| 6,928,461 | B2 | 8/2005 | Tuli | |
| 7,035,803 | B1 * | 4/2006 | Ostermann et al. | 704/260 |
| 7,043,521 | B2 * | 5/2006 | Eitel | 709/202 |
| 7,460,130 | B2 * | 12/2008 | Salganicoff | 345/590 |
| 7,594,177 | B2 * | 9/2009 | Jojic et al. | 715/720 |
| 2002/0133828 | A1 * | 9/2002 | Foster | 725/110 |
| 2004/0070600 | A1 | 4/2004 | Morrisroe et al. | |
| 2007/0130015 | A1 * | 6/2007 | Starr et al. | 705/14 |
| 2008/0028037 | A1 | 1/2008 | Moyer et al. | |
| 2009/0024923 | A1 | 1/2009 | Hartwig et al. | |
| 2010/0074535 | A1 | 3/2010 | Bennett | |
| 2011/0047223 | A1 | 2/2011 | Naftali-Menajed | |

OTHER PUBLICATIONS

Syd Lawrence; jquery.videoBG; Mar. 13, 2011; GitHub; pp. 1-9.*
dSKY; Full Screen Video Background Template v2; Sep. 23, 2009; ActiveDen; pp. 1-7.*
Lee, et al., "An Interactive Video Delivery and Caching System using Video Summarization", in Journal of Computer Communications, vol. 25, Issue 4, Mar. 2002, 9 pages.
Chen, et al., "Real Time Video and Audio in the World Wide Web", in Journal of World Wide Web, vol. 1, Jan. 1996, 12 pages.

* cited by examiner

*Primary Examiner* — Doug Hutton, Jr.
*Assistant Examiner* — Andrew Dyer
(74) *Attorney, Agent, or Firm* — Shook, Hardy & Bacon L.L.P.

(57) ABSTRACT

Systems, methods, and computer-readable media for presenting video as at least a portion of the background of search engine home pages are provided. Upon receiving a request for presentation of a search engine home page, a static image is transmitted for presentation as at least a portion of the background for the search engine home page. Also transmitted is a video file. The static image may or may not be associated with the video file. After a predetermined amount of time, play of the video file is initiated without user action, the video file replacing the static image as at least a portion of the background of the search engine home page. In this way, the user receives a seamless transition from a static image to a video presentation and is provided a rich, immersive experience at the search engine home page.

18 Claims, 4 Drawing Sheets

PRESENTING VIDEO AS A BACKGROUND ON A SEARCH ENGINE HOME PAGE

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. Initially upon a user expressing a desire to utilize a search utility, a home page associated with the particular search utility is presented that includes a search query input area into which the user may input keywords or phrases for which relevant search results are desired. Oftentimes, also presented is a background image for the search engine home page. Generally, such search utility home page background images are static images that may be visually appealing to the user but offer little else in terms of an immersive experience or to encourage attachment of the user with the search utility.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, presenting video as at least a portion of a background for a search engine home page. Upon receiving a request for presentation of a search engine home page, a static image is transmitted for presentation as at least a portion of the background for the search engine home page. Also transmitted is a video file (e.g., a streaming video file). The static image may or may not be associated with the video file. After a predetermined amount of time (e.g., after a predetermined period of user inactivity with respect to the search engine home page), play of the video file is initiated without user action, the video file replacing the static image as at least a portion of the background of the search engine home page. In this way, the user receives a seamless transition from a static image to a video presentation and is provided a rich, immersive experience at the search engine home page.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
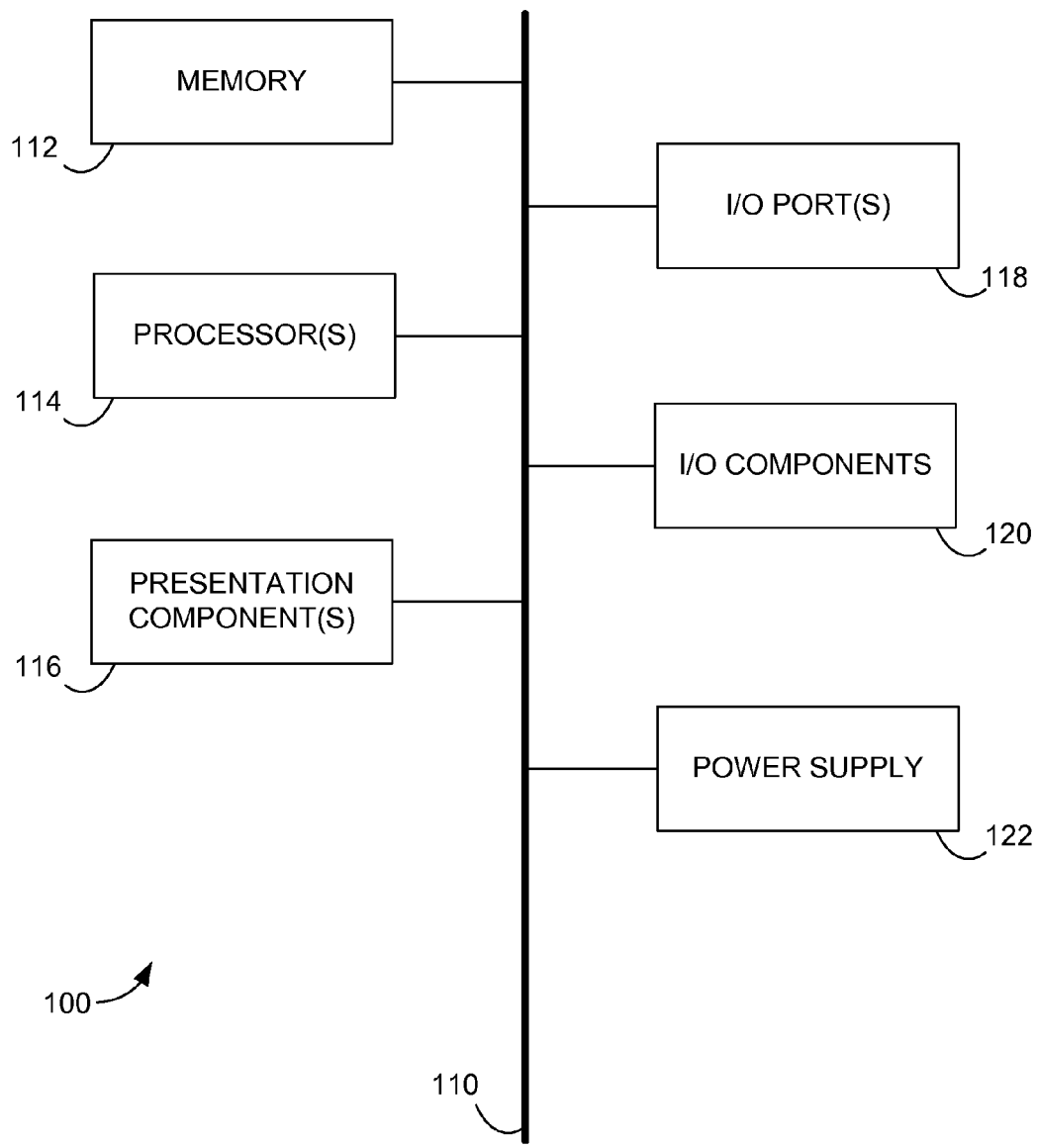
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, presenting video as at least a portion of a background for a search engine home page. Upon receiving a request for presentation of a search engine home page, a static image is transmitted for presentation as at least a portion of the background for the search engine home page. Also transmitted is a video file. In embodiments, the video file is a streaming video file or other video file that is downloaded in parts. The static image may or may not be associated with the video file. After a predetermined amount of time (e.g., after a predetermined period of user inactivity with respect to the search engine home page), play of the video file is initiated without user action, the video file replacing the static image as at least a portion of the background of the search engine home page. In this way, the user receives a seamless transition from a static image to a video presentation and is provided a rich, immersive experience at the search engine home page. (It should be noted that while the phrase "search engine home page" is used herein, the functionality described is equally applicable to any online landing page. Any and all such variations, and any combination thereof, are contemplated to be within the scope of embodiments of the present invention.)

Accordingly, one embodiment of the present invention is directed to one or more computer-readable storage media storing computer-useable instructions that, when used by one or more computing devices, cause the one or more computing devices to perform a method for presenting video as a background for a search engine home page. The method includes receiving a request for presentation of a search engine home page and transmitting an image for presentation as the background for the search engine home page and a video file. At least a portion of the image represents an optimized frame of the video file. After a predetermined amount of time, the method further includes automatically initiating play of the video file without user action. The video file replaces the at least a portion of the image as the background for the search engine home page.

Another embodiment of the present invention is directed to a system for presenting video as a background for a search engine home page. The system comprises a computing device associated with one or more processors and one or more computer-readable storage media, a search server, and a data store coupled with the search server. The search server is configured to receive a request for presentation of a search engine home page and to transmit an image and a video file for presentation as the background for the search engine home page. After a predetermined period of user inactivity subsequent to transmitting the image and the video file, the search server is further configured to automatically initiate play of the video file without user action, the video file replacing at least a portion of the image as the background for the search engine home page.

In yet another embodiment, the present invention is directed to a method performed by a computing device having a processor and a memory for presenting video as a background for a search engine home page. The method includes receiving a request for presentation of a search engine home page from a client device and determining that the requesting client device is capable of presenting video as at least a portion of the background for the search engine home page. The method further includes transmitting a static image and a video file to the client device for presentation as the at least a portion of the background for the search engine home page. At least a portion of the static image corresponds to a displayable frame of the video file. After a predetermined period (for instance, a predetermined period of user inactivity with respect to the search engine home page), the method further includes transitioning the at least a portion of the static image corresponding to the displayable frame of the video file with a plurality of sequentially-arranged frames of the video file as the at least a portion of the background of the search engine home page.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention relate to systems, methods, and computer-readable storage media for presenting video as at least a portion of a background of a search engine home page. Upon receiving a request for presentation of a search engine home page, a static image is transmitted for presentation as at least a portion of the background for the search engine home page. Also transmitted is a video file, for instance, a streaming video file. The static image may or may not be associated with the video file. After a predetermined amount of time (e.g., after a predetermined period of user inactivity with respect to the search engine home page), play of the video file is initiated without user action, the video file replacing the static image as at least a portion of the background of the search engine home page. In this way, the user receives a seamless transition from a static image to a video presentation and is provided a rich, immersive experience at the search engine home page.

Figure 2:
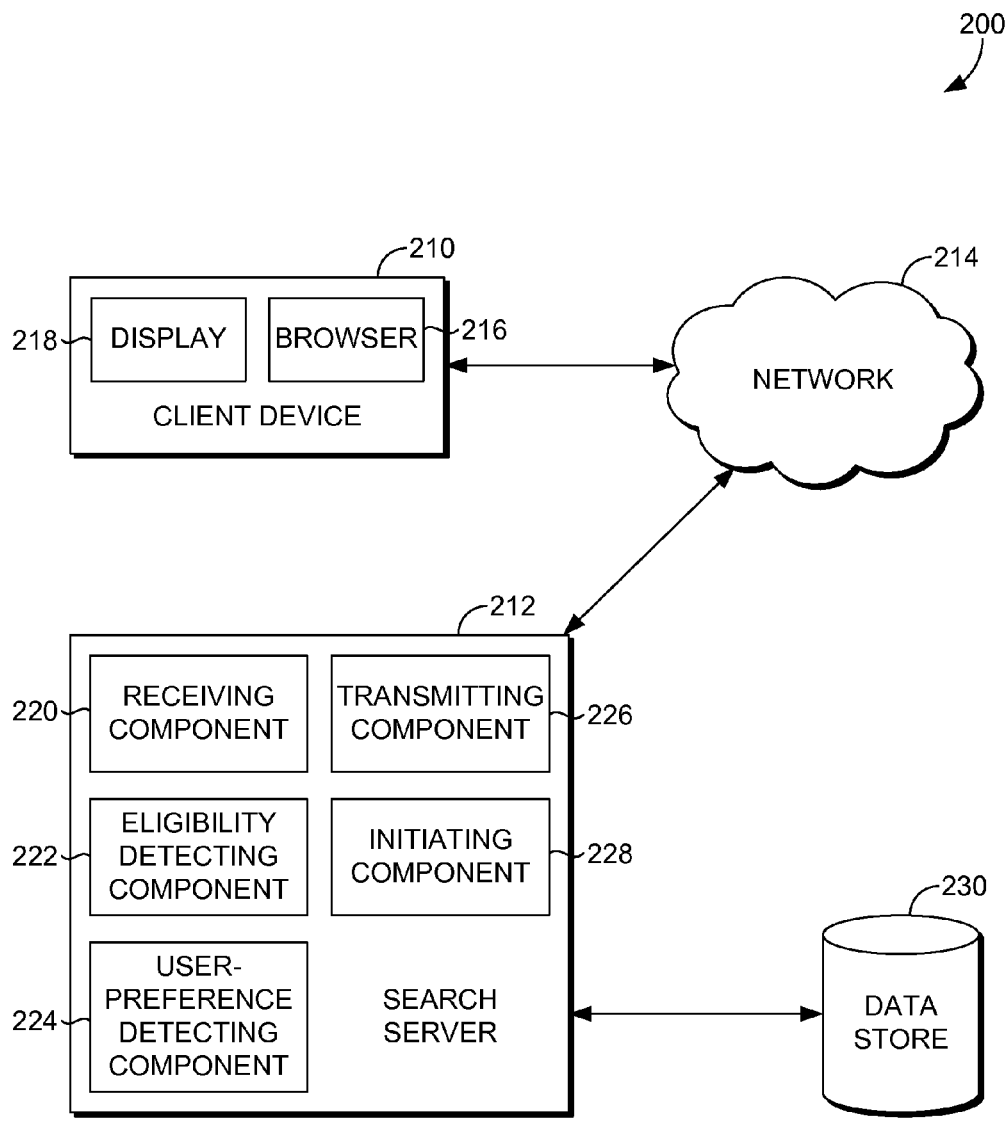
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which a video file may be transmitted and displayed as at least a portion of the background for a search engine home page at a client computing device. As will be described in further detail below, embodiments of the present invention provide a seamless transition from a static image displayed as at least a portion of the background of a search engine home page to a video presentation providing users with a rich, immersive experience at the search engine home page.

Among other components not shown, the computing system 200 generally includes a client computing device 210 and a search server 212 in communication with one another via a network 214. The network 214 may include, without limitation, one or more local area networks (LANs) and/or wide area networks (WANs). Such networking environments are commonplace in offices, enterprise-wide computer networks, intranets and the Internet. Accordingly, the network 214 is not further described herein.

It should be understood that any number of client computing devices and search servers may be employed in the computing system 200 within the scope of embodiments of the present invention. Each may comprise a single device/interface or multiple devices/interfaces cooperating in a distributed environment. For instance, the search server 212 may comprise multiple devices and/or modules arranged in a distributed environment that collectively provide the functionality of the search server 212 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the client computing device 210, as an Internet-based service, or as a module inside the search server 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the search server 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. As illustrated, the client computing device 210 includes a browser 216 and a display 218. The browser 216 is configured to render a search engine home page having a static image and/or video as at least a portion of the background in association with the display 218 of the user computing device 210. The browser 216 is further configured to receive user input of requests for various web pages (including search engine home pages) and to receive content for display, for instance, from the search server 212. It should be noted that the functionality described herein as being performed by the browser 216 may be performed by any other application capable of rendering web content. Any and all such variations, and any combination thereof, are contemplated to be within the scope of embodiments of the present invention.

The search server 212 is configured to receive and respond to requests that it receives from components associated with client computing devices, for instance, the browser 216 associated with the client computing device 210. The search server 212 may be associated with any search engine capable of searching text and/or content. Those skilled in the art will recognize that the present invention may be implemented with any number of searching utilities. For example, an Internet search engine or a database search engine may utilize the present invention. These search engines are well known in the art, and commercially available engines share many similar processes not further described herein.

As illustrated, the search server 212 includes a receiving component 220, a capability determining component 222, a preference determining component 224, a transmitting component 226, and an initiating component 228. The illustrated search server 212 also includes or has access to a data repository 230. The data repository 230 is configured to store information associated with static images, video files, and the like. In various embodiments, such information may include, without limitation, raw image and/or video files, optimized image and/or video files, and the like. In embodiments, the data repository 230 is configured to be searchable for one or more of the items stored in association therewith. It will be understood and appreciated by those of ordinary skill in the art that the information stored in association with the data repository 230 may be configurable and may include any information relevant to images and/or video files to be associated with presentation as at least a portion of the background for a search engine home page. The content and volume of such information are not intended to limit the scope of embodiments of the present invention in any way. Further, though illustrated as a single, independent component, the data repository 230 may, in fact, be a plurality of storage devices, for instance a database cluster, portions of which may reside in association with the search server 212, the client computing device 210, another external computing device (not shown), and/or any combination thereof.

The receiving component 220 of the search server 212 is configured to receive requests for presentation of search engine home pages. Typically, such a request is received via a browser associated with the client computing device, for instance, the browser 216 associated with the client computing device 210.

The capability determining component 222 is configured to determine whether a requesting client computing device is capable of receiving a video presentation as at least a portion of the background of a search engine home page and of presenting the same. In embodiments, the capability determining component 222 may also be configured to determine which video format(s) are supported by a requesting client device that it determines to be capable of presenting a video presentation as at least a portion of the background of a search engine home page. Similarly, the preference determining component 224 is configured to determine whether any applicable user-preference settings permit or hinder such a video presentation as at least a portion of the background of a search engine home page.

The transmitting component 226 is configured to transmit a static image for presentation as at least a portion of the background for the search engine home page, for instance, to a browser associated with a client computing device. In embodiments, the static image includes one or more interactive regions. Upon user interaction with a particular interactive region, additional information and/or images are presented. The additional information and/or images generally relate in some way to the underlying image associated with the particular interactive region.

One or more portions of the static image may be associated with a video file. Oftentimes, high-quality and/or high-resolution images and video files are too large for efficient and timely transmission over the Internet. However, it is desirable that the images/videos be able to load rapidly so as to provide user functionality as quickly as possible. As such, it may be desirable to optimize the images and/or video files, for instance, via compression techniques and/or resolution-altering techniques. In embodiments of the present invention, a frame of a video file that has been optimized is transmitted as at least a portion of the static image.

The transmitting component 226 is further configured to transmit video files for presentation as at least a portion of the background for search engine home pages. In embodiments, such transmission takes place in a video format determined to be acceptable by the requesting client computing device. In embodiments, such video files may be optimized (e.g., utilizing compression and/or resolution-altering techniques) prior to transmission.

The initiating component 228 is configured to initiate play of a video file that is transmitted by the transmitting component 226. In embodiments, such initiation takes place automatically without user action. It will be understood and appreciated by those of ordinary skill in the art that user-initiation of play of video file content is also contemplated to be within the scope of embodiments of the present invention. After a predetermined amount of time, the video file replaces the static image (for instance, the optimized frame of the video file) as at least a portion of the background for the search engine home page. In embodiments, the predetermined amount of time corresponds to one or more of a time period for transmitting the video file and a predetermined period of user inactivity with respect to the search engine home page subsequent to transmitting the image for presentation.

In one embodiment, play is initiated sequentially through the frames of the video file beginning with the frame that is transmitted as the static image. In this way, play initiation begins seamlessly for the user—simply picking up from where the image already is. In another embodiment, a transition takes place between the static image and the video file, for instance, a fade out/fade in transition, or the like. Any and all such variations, and any combination thereof, are contemplated to be within the scope of embodiments of the present invention.

Figure 3:
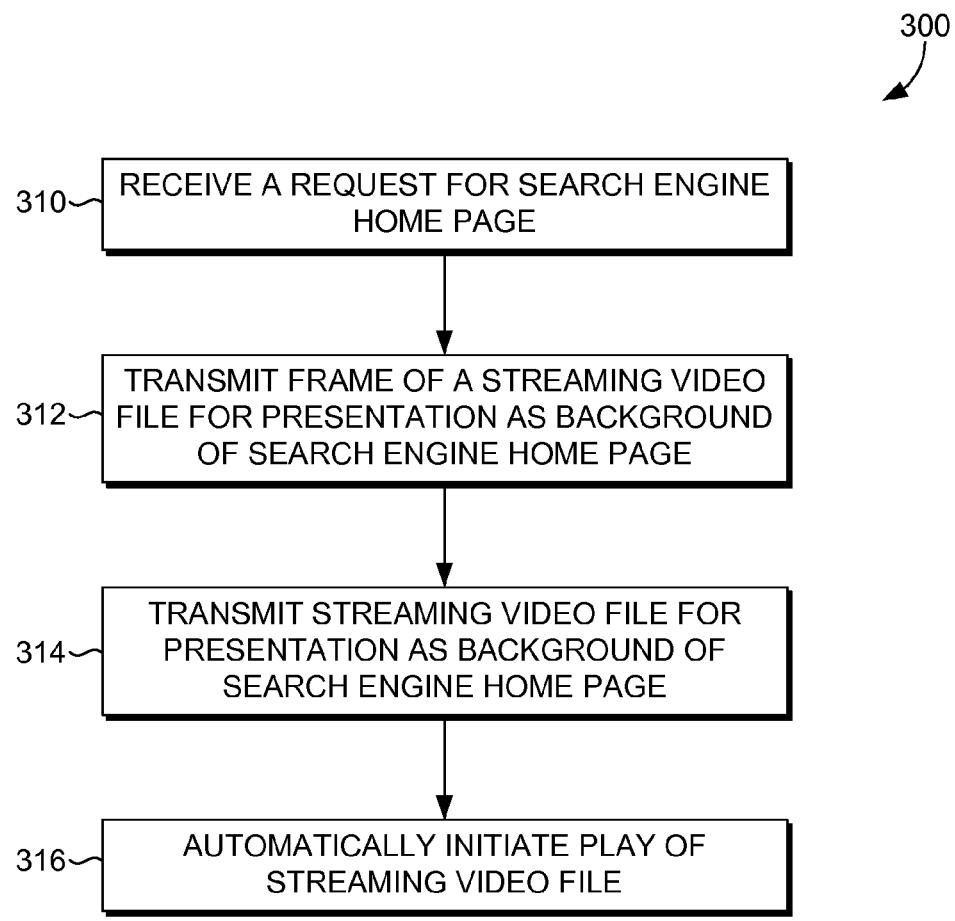
FIG. 3 is a flow diagram showing an exemplary method for presenting video as at least a portion of the background for search engine home pages, in accordance with an embodiment of the present invention.

Turning now to FIG. 3, a flow diagram is provided that illustrates an exemplary method 300 for presenting video as a background for a search engine home page, in accordance with an embodiment of the present invention. Initially, as indicated at block 310, a request for presentation of a search engine home page is received, for instance, from client device 210 of FIG. 2. As indicated at block 312, an image is transmitted (e.g., from the search server 212 of FIG. 2) for presentation as at least a portion of the background for the search engine home page (for instance, in association with the display 218 of the client device 210 of FIG. 2). Also transmitted is a video file, as indicated at block 314. In embodiments, at least a portion of the transmitted image represents an optimized frame of the video file. After a predetermined amount of time (e.g., after a predetermined period of user inactivity with respect to the displayed search engine home page), play of the video file is automatically initiated without user action, as indicated at block 316. The video file replaces the at least a portion of the image as the background for the search engine home page (for instance, in association with the display 218 of the client device 210 of FIG. 2).

Figure 4:
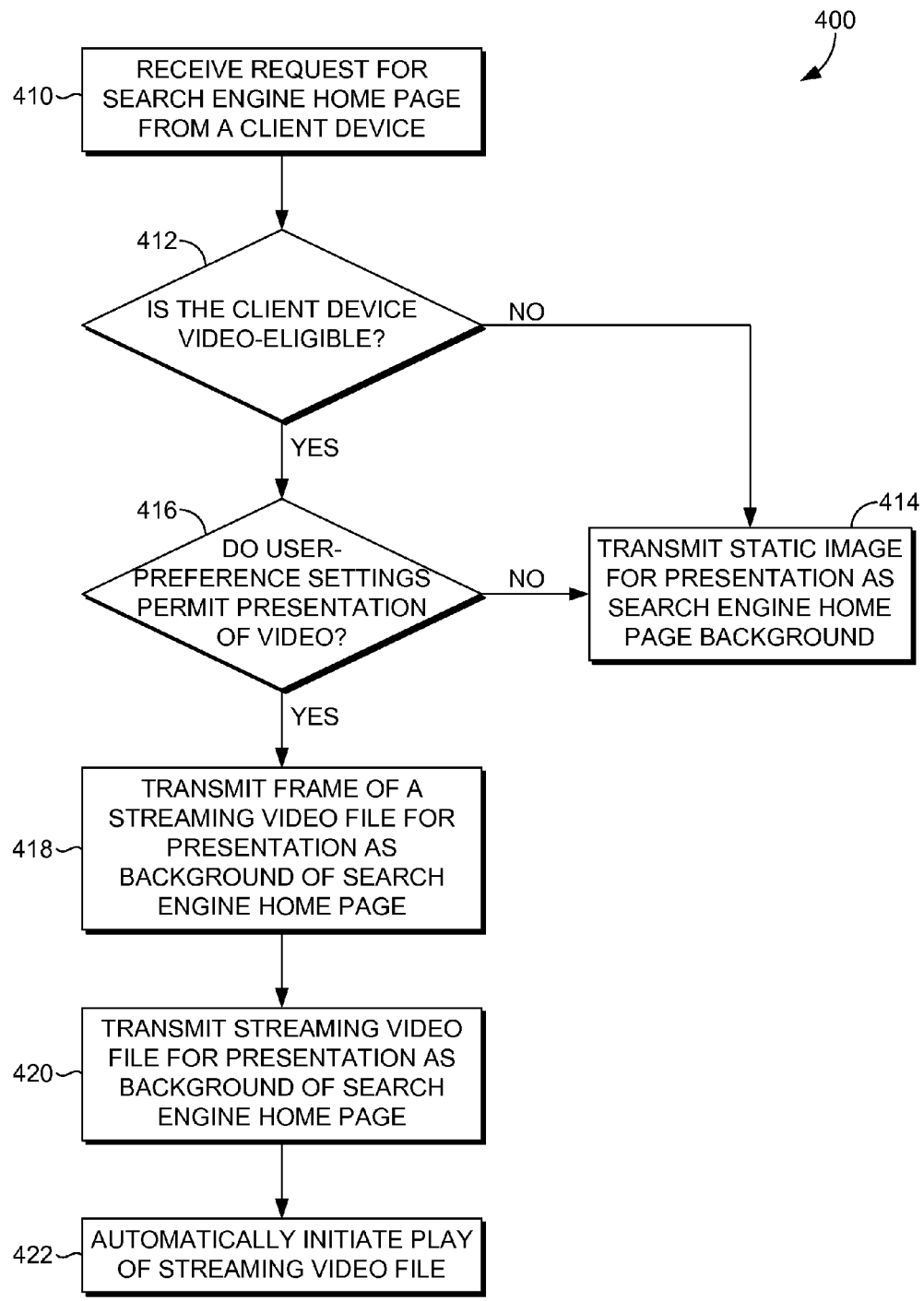
FIG. 4 is a flow diagram showing an exemplary method for presenting video as at least a portion of the background for search engine home pages, in accordance with another embodiment of the present invention.

With reference to FIG. 4, a flow diagram is provided that illustrates another exemplary method 400 for presenting video as a background for a search engine home page, in accordance with an embodiment of the present invention. Initially, as indicated at block 410, a request for presentation of a search engine home page is received from a client device, for instance, from the client device 210 of FIG. 2. As indicated at block 412, it is determined whether the requesting client device is capable of presenting video as at least a portion of the background for the search engine home page. If it is determined that the requesting client device is not capable of presenting video as at least a portion of the background for the search engine home page, a static image is transmitted for presentation as the background of the search engine home page, as indicated at block 414. The static image may or may not be associated with a frame of a video file.

As indicated at block 416, it is also determined whether the requesting client device is associated with any applicable preference settings that either permit or hinder presentation of video as at least a portion of the background for the search engine home page. If it is determined that the client device is associated with any preference settings that do not permit or otherwise hinder presentation of a video file as at least a portion of the background for a search engine home page, a static image is transmitted for presentation as at least a portion of the background of the search engine home page, as indicated at block 414. Again, the static image may or may not be associated with a frame of a video file.

If it is determined at block 412 that the requesting client device is capable of presenting video as at least a portion of the background for the search engine home page and it is determined at block 414 that any applicable preference settings permit and do not otherwise hinder presentation of video as at least a portion of the background for a search engine home page, a displayable frame of a video file is transmitted (e.g., from the search server 212 of FIG. 2) to the requesting device for presentation as at least a portion of the background of the search engine home page (for instance, in association with the display 218 of the client device 210 of FIG. 2). This is indicated at block 418. In embodiments, the displayable frame is the initial frame of the video file. In other embodiments, the displayable frame is not the initial frame but is another frame of the video file that is rich and relevant to the content of the video file.

After a predetermined period, for instance, after a predetermined period of user inactivity with respect to the search engine home page, at least a portion of the static image corresponding to the displayable frame of the video file is transitioned into a plurality of sequentially-arranged frames of the video file as the at least a portion of the background of the search engine home page. This is indicated at block 422. Thus, the video file replaces the displayable frame as the at least a portion of the background for the search engine home page (for instance, in association with the display 218 of the client device 210 of FIG. 2). In embodiments, transitioning the at least a portion of the static image corresponding to the displayable frame of the video file as the at least a portion of the background of the search engine home page is seamless and begins with the displayable frame. In other embodiments, a transition (e.g., a fade-in/fade-out transition) is initiated.

Any and all such variations, and any combination thereof, are contemplated to be within the scope of embodiments of the present invention.

As can be understood, embodiments of the present invention provide systems and methods for presenting video as at least a portion of the background for a search engine home page. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 400 of FIG. 4 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. Computer storage memory storing computer-useable instructions that, when used by one or more computing devices, cause the one or more computing devices to perform a method for presenting video as a background for a search engine home page, the method comprising:
   receiving a request for presentation of the search engine home page;
   determining that a client device making the request is associated with a preference setting that permits presentation of video as at least a portion of the background for the search engine home page;
   transmitting an image for presentation as the background for the search engine home page and a video file, at least a portion of the image representing an optimized frame of the video file; and
   after a predetermined amount of time, automatically initiating play of the video file without user action, the video file replacing the at least a portion of the image as the background for the search engine home page.

2. The computer storage memory of claim 1,
   wherein receiving the request for presentation of the search engine home page comprises receiving the request from a client device,
   and wherein the method further comprises, prior to transmitting the video file, determining that the requesting client device is capable of presenting video as at least a portion of the background for the search engine home page.

3. The computer storage memory of claim 1,
   wherein receiving the request for presentation of the search engine home page comprises receiving the request from a client device,
   and wherein the method further comprises, prior to transmitting the video file, determining that the client device is associated with a preference setting that permits presentation of video as at least a portion of the background for the search engine home page.

4. The computer storage memory of claim 1, wherein the video file includes a plurality of sequentially-arranged frames, and wherein automatically initiating play of the video file comprises seamlessly initiating play of the frames of the video file sequentially beginning with the optimized frame.

5. The computer storage memory of claim 1, wherein the video file includes a plurality of sequentially-arranged frames, and wherein automatically initiating play of the video file comprises initiating a transition from the optimized frame to the plurality of sequentially-arranged frames of the video file.

6. The computer storage memory of claim 1, wherein the predetermined amount of time corresponds to a predetermined period of user inactivity after transmitting the image for presentation.

7. The computer storage memory of claim 1, wherein the image includes at least one interactive region.

8. A system for presenting video as a background for a search engine home page, the system comprising:
   a computing device associated with one or more processors and one or more computer-readable storage media;
   a search server; and
   a data store coupled with the search server,
   wherein the search server:
      receives a request from a client device for presentation of the search engine home page;
      determines that the client device is associated with a preference setting that permits presentation of video as at least a portion of the background for the search engine home page;
      transmits an image and a video file for presentation as the background for the search engine home page; and
      after a predetermined period of user inactivity subsequent to transmitting the image, automatically initiates play of the video file without user action, the video file replacing at least a portion of the image as the background for the search engine home page, and wherein, prior to transmitting the video file, the search server.

9. The system of claim 8,
   wherein the search server receives the request for presentation of the search engine home page from a client device,
   and wherein, prior to transmitting the video file, the search server determines that the requesting client device is capable of presenting video as at least a portion of the background for the search engine home page.

10. The system of claim 8, wherein the video file includes a plurality of sequentially-arranged frames, wherein the at least a portion of the image represents an optimized frame of the plurality of sequentially-arranged frames, and wherein the search server automatically initiates play of the plurality of frames of the video file sequentially beginning with the optimized frame.

11. The system of claim 8, wherein the video file includes a plurality of sequentially-arranged frames, wherein the at least a portion of the image represents an optimized frame of the plurality of sequentially-arranged frames, and wherein the search server automatically initiates a transition from the optimized frame to the plurality of sequentially-arranged frames of the video file.

12. The system of claim 8, wherein the image includes at least one interactive region.

13. A method performed by a computing device having a processor and a memory for presenting video as a background for a search engine home page, the method comprising:

receiving a request for presentation of the search engine home page from a client device;

determining that the requesting client device is capable of, and associated with a preference setting that permits, presenting video as at least a portion of the background of the search engine home page;

transmitting a static image to the client device for presentation as the at least a portion of the background for the search engine home page, wherein at least a portion of the static image corresponds to a displayable frame of a video file; and after a predetermined period, transitioning the at least a portion of the static image corresponding to the displayable frame of the video file with a plurality of sequentially-arranged frames of the video file as the at least a portion of the background of the search engine home page.

14. The method of claim 13, wherein the displayable frame of the video file is an optimized frame of the video file.

15. The method of claim 14, wherein transitioning the at least a portion of the static image corresponding to the displayable frame of the video file with the plurality of sequentially-arranged frames of the video file comprises initiating play of the plurality of frames of the video file sequentially beginning with the optimized frame.

16. The method of claim 14, wherein transitioning the at least a portion of the static image corresponding to the displayable frame of the video file with the plurality of sequentially-arranged frames of the video file comprises initiating a transition from the optimized frame to the plurality of sequentially-arranged frames of the video file.

17. The method of claim 13, wherein the static image includes at least one interactive region.

18. The method of claim 13, wherein the predetermined period is a predetermined period of user inactivity after transmitting the static image for presentation.

* * * * *

UNITED STATES PATENT AND TRADEMARK OFFICE
CERTIFICATE OF CORRECTION

PATENT NO.      : 8,381,105 B2                                          Page 1 of 1
APPLICATION NO. : 13/183135
DATED           : February 19, 2013
INVENTOR(S)     : Chand et al.

It is certified that error appears in the above-identified patent and that said Letters Patent is hereby corrected as shown below:

In the Specification

Column 4, line 13, delete "nonvolatile" and insert -- non-volatile --, therefor.

Column 4, line 28, delete "nonvolatile" and insert -- non-volatile --, therefor.

Signed and Sealed this
Tenth Day of February, 2015

Michelle K. Lee
*Deputy Director of the United States Patent and Trademark Office*